Figure 1:
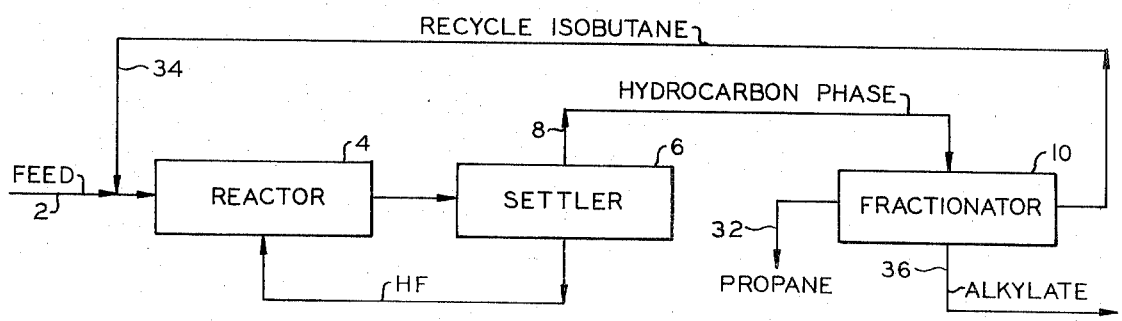

United States Patent [19]
Chapman

[11] 3,856,629
[45] Dec. 24, 1974

[54] FRACTIONATOR AND METHOD OF FRACTIONATING

[75] Inventor: Charles C. Chapman, Bartlesville, Okla.

[73] Assignee: Phillips Petroleum Company, Bartlesville, Okla.

[22] Filed: June 9, 1972

[21] Appl. No.: 261,368

[52] U.S. Cl............................ 202/158, 261/114 R
[51] Int. Cl............................................. B01d 3/14
[58] Field of Search......... 202/158, 153; 261/114 R; 260/683.41 R; 196/111, 98, 99, 100; 62/42

[56] References Cited
UNITED STATES PATENTS

| | | | |
|---|---|---|---|
| 1,915,681 | 6/1933 | Luster................................. | 202/158 |
| 2,070,100 | 2/1937 | Twomey.......................... | 261/114 R |
| 2,988,347 | 6/1961 | Molique.......................... | 261/114 R |
| 3,073,878 | 1/1963 | Johnson......................... | 260/683.41 |
| 3,403,198 | 9/1968 | Van Pool....................... | 260/683.41 |
| 3,412,016 | 11/1968 | Graven.............................. | 202/158 |
| 3,502,547 | 3/1970 | Bridgeford......................... | 202/158 |

FOREIGN PATENTS OR APPLICATIONS 1,082,896   6/1952   France........................... 261/114 R Primary Examiner—Wilbur L. Bascomb, Jr.
Assistant Examiner—Frank Sever

[57] ABSTRACT

An improved fractionator and method for separating a hydrocarbon feed stream into first, second, and third component streams by passing the feed stream through an upper chamber of a vessel in indirect heat exchange relationship with separated first and second upper chambers of the vessel which are in fluid communication with a lower portion of the vessel. Said first and second upper chambers and said lower chamber have a multiplicity of spaced-apart fractionating trays extending thereacross.

2 Claims, 2 Drawing Figures

FRACTIONATOR AND METHOD OF FRACTIONATING

It is desirable to provide an improved fractionator and a method for separating a hydrocarbon feed stream into first, second, and third component streams. In another aspect, it is desired to provide apparatus and method for separating a hydrocarbon phase feed stream discharging from an alkylation system such as an HF reactor of an HF alkylation system into a propane stream, an isobutane stream, and an alkylate stream.

This invention therefore resides in an improved fractionator and method for separating a hydrocarbon feed stream into first, second, and third component streams by passing the feed stream through an upper chamber of a vessel and in indirect heat exchange relationship with separated first and second upper chambers of the vessel which are in fluid communication with a lower portion of the vessel. Said first and second upper chambers and said lower chamber have a multiplicity of spaced-apart fractionating trays extending thereacross.

Other aspects, objects, and advantages of the present invention will become apparent from a study of the disclosure, the appended claims, and the drawings.

The drawings are diagrammatic views of an HF alkylation system and a fractionator of the system.

Figure 2:
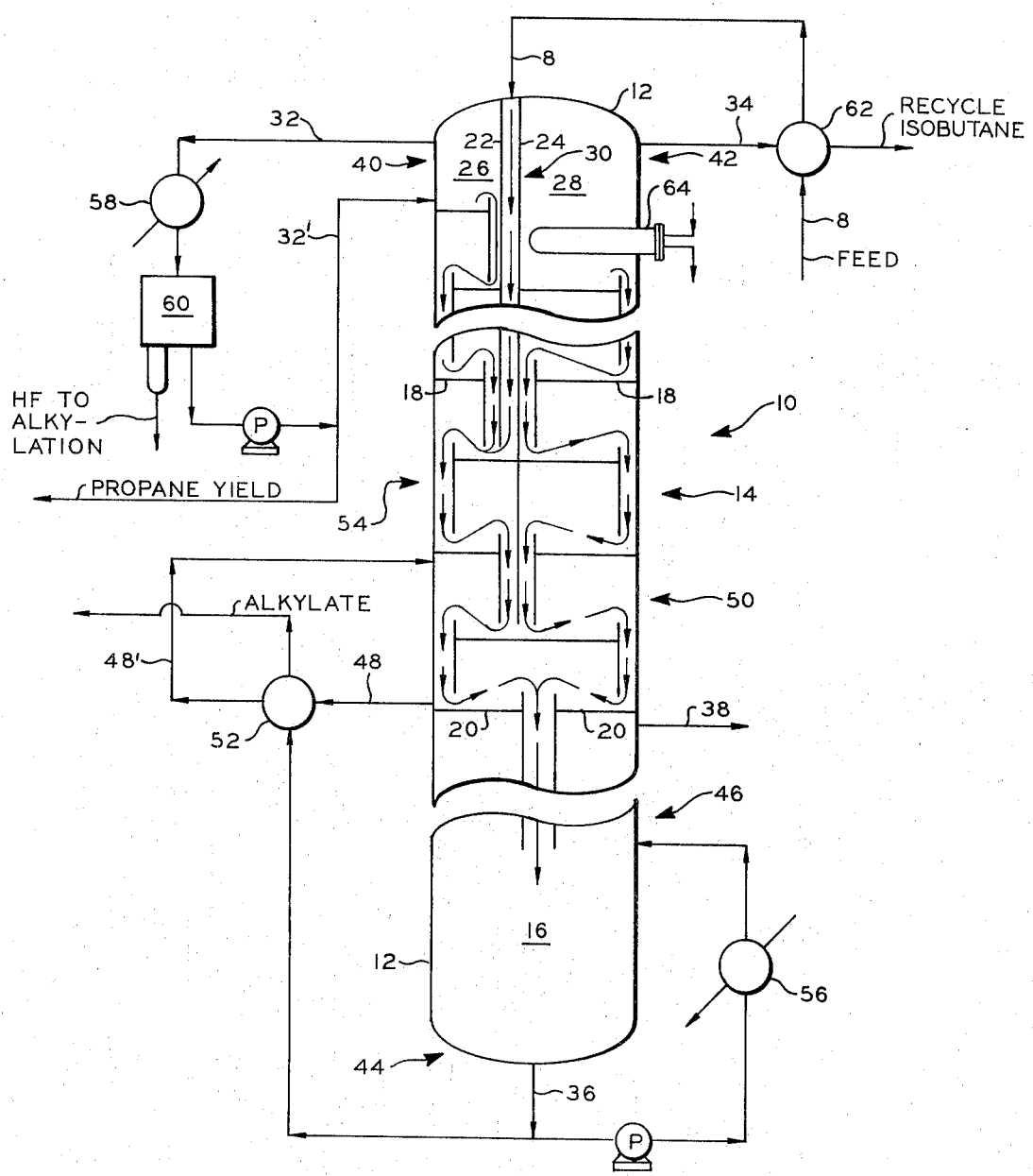

FIG. 1 shows an example HF alkylation system with the fractionator of this invention positioned therein and FIG. 2 shows a diagrammatic view of the apparatus of this invention.

Referring to FIG. 1, an incoming stream 2, e.g. isobutane, propylene, and butylenes, is passed to an HF alkylation reactor 4. Hydrocarbon and HF emulsion is passed from the reactor 4 to a settler 6 at which location the hydrocarbon phase is separated and passed as a feed stream 8 to a fractionator 10 for separation into at least a propane stream, an isobutane stream and an alkylate stream.

Referring to FIG. 2, the fractionator 10 is preferably an elongated, vertically extending vessel 12.

The vessel 12 has a chamber extending therethrough which is separated into upper and lower chamber portions 14, 16.

A multiplicity of spaced-apart fractionating trays 18 extend across the upper chamber portion 14 and a multiplicity of spaced-apart fractionating trays 20 extend across the lower chamber portion 16.

Means, such as for example vertically oriented, laterally spacedapart partitions 22, 24 are sealably positioned in the upper chamber 14 of the vessel 12 for vertically separating the upper chamber portion 14 into first and second upper chamber portions 26, 28 and forming a feed stream conduit 30 through at least a portion of the upper chamber portion 14 of the vessel 12. Feed is added via conduit 8 to conduit 30.

The feed stream conduit 30 opens into the first upper chamber portion 26, preferably at a location spaced about 10 percent to about 80 percent downwardly along the first upper chamber portion as measured from the top of the vessel 12. The locus of feed injection from conduit 30 into zone 26 depends upon the composition of the feed, as is known in the art.

Fractionating trays 18 and 20 can be such as bubble cap, sieve or perforated trays, flexitrays, float valve trays, ripple trays, and the like, for contacting the downflowing liquid with the rising vapors.

Means, such as separate conduits 32, 34, 36 for example, are provided for removing respective separated first, second, and third component streams from the vessel 12. A fourth conduit 38 for example can be provided for removing a separated fourth component stream from the vessel. It is preferred that the first conduit 32 be positioned at an upper portion 40 of the first upper chamber portion 26 for removing propane vapor for example therefrom, the second conduit 34 be positioned at an upper portion 42 of the second upper chamber portion 28 for removing isobutane for example therefrom, the third conduit 36 be positioned at a lower portion 44 of the lower chamber portion 16 for removing alkylate for example therefrom, and the fourth conduit 38 be positioned at a middle portion 46 of the lower chamber portion 16 for removing normal butane vapor for example therefrom.

It is preferred that a fifth conduit 48 for example be positioned at an upper portion 50 of the lower chamber portion 16 and brought into indirect heat exchange relationship through a heat exchanger 52 with the third conduit 36 and returned via line 48' to a lower portion 54 of the first upper chamber portion 26. This fifth conduit recycles fluid from the lower chamber portion 16 to the first upper chamber portion 26 for purposes of interheating, to reduce utilities and to increase recovery of high purity isobutane.

A reboiler 56 can be connected to the third conduit 36 and to the middle portion 46 of the lower chamber portion 16 for passing a portion of the alkylate stream for example to the reboiler 56 for increasing the temperature of said stream portion and then into the lower chamber portion 16, preferably below the lowest tray 20, for maintaining the temperature of said portion 16 at a desired level for efficient fractionation of the feed stream 8 in the vessel 12, as is known in the art.

The first conduit 32 is preferably attached to a condenser 58 which is attached to an accumulator 60. Propane is condensed in the condenser 58, passes to the accumulator 60 and a portion of the condensate is returned as overhead reflux via line 32' to the upper portion 40 of the first upper chamber portion 26 at a location lower in elevation than the connection of the first conduit 32 to the vessel 12 for providing reflux for the first upper chamber portion 26. Usually this reflux is added to the top tray in portion 26.

It is also preferred that the feed stream 8 be passed through a heat exchanger 62 in indirect heat exchange with the second component stream (preferably isobutane) discharging from the vessel 12 through the second conduit 34 to heat the feed 8 and further cool stream 34. A cooler 64 is also preferably positioned in the second upper chamber portion 28 for controlling the temperature of the fluids therein. This allows yielding a high purity stream low in higher boiling components.

The following calculated example shows the preferred operating ranges and example operating conditions of the apparatus of this invention.

The invention effects very efficient recovery of HF in the overhead accumulator; very efficient recovery of propane; very efficient isobutane recovery with minimum isopentanes and light alkylate therein, and with minimum HF in this isobutane recycle stream. The feed conduit 30 acts as an intercooler on the isobutane, or zone 28, portion of the fractionator, and as an interheater on the propane, or zone 26, portion of the fractionator.

EXAMPLE

| | | |
|---|---|---|
| Feed Stream 8 | | 82,740 Bbl/day |
| Feed Stream Composition, Vol % | | |
| Propane and Lighter | 11.0 | |
| Isobutane | 69.0 | |
| Normal Butane | 5.2 | |
| iC$_5$ and heavier | 14.8 | |
| Propane Yield, (Conduit 32) | | 4,000 Bbl/day |
| Propane Composition, Vol % | | |
| Propane and Lighter | 98.5 | |
| Isobutane (& heavier) | 1.5 | |
| Normal Butane (Vapor) Yield, as liquid, B/D (Conduit 38) | | 550 Bbl/day |
| n-Butane Composition, Vol % | | |
| Isobutane | 5 | |
| Normal Butane | 85 | |
| iC$_5$ and heavier | 10 | |
| Isobutane Yield, 13 (Conduit 34) | | 66,340 Bbl/day |
| Isobutane Composition, Vol % | | |
| Propane and Lighter | 3 | |
| Isobutane | 94 | |
| Normal Butane | 2 | |
| Pentanes plus | 1 | |
| Alkylate Yield (iC$_5$ and heavier) (Conduit 36) | | 11,850 Bbl/day |
| Reflux (Conduit 32') | | 30,000 Bbl/day |
| Inlet Temperature, °F., Preferred Range 155 to 175°, Example 110 | | |
| Interheating, (Conduit 48') | | 10,000 Bbl/day |
| Inlet Temperature, °F., Preferred Range 225 to 250, Example 235 | | |

| Tower Conditions: | Preferred Range | Example |
|---|---|---|
| Lower Chamber Portion (16) | | |
| Temperature, °F. | 380 to 420 | 400 |
| Pressure, psig | 280 to 340 | 310 |
| First Upper Chamber Portion (26) | | |
| Top Temperature, °F. | 110 to 140 | 130 |
| Bottom Temperature, °F. | 210 to 250 | 230 |
| Pressure, psig | 270 to 330 | 300 |
| Second Upper Chamber Portion (28) | | |
| Top Temperature, °F. | 190 to 230 | 210 |
| Bottom Temperature, °F. | 215 to 255 | 235 |
| Pressure, psig | 270 to 330 | 300 |
| Tray Receiving Intercool (64) | | |
| Temperature, °F. | 190 to 230 | 210 |
| Tower Cross-Sectional Areas | | |
| Depropanizer, ft.$^2$ | | 100 |
| Deisobutanizer, ft.$^2$ | | 120 |
| Main Column, ft.$^2$ | | 227 |
| Number of Trays in Zones | | |
| Depropanizer (26) | | 30 |
| Deisobutanizer (28) | | 30 |
| Main Section (16) | | 30 |

Other modifications and alterations of this invention will become apparent to those skilled in the art from the foregoing discussion, example, and accompanying drawing, and it should be understood that this invention is not to be unduly limited thereto.

What is claimed is:

1. Fractionation apparatus adapted to separate fluid mixture into at least three products, comprising:
    a vessel adapted to be mounted in a vertical position;
    a first partition extending from the top of said vessel downwardly to a first location between the top and the bottom of the vessel, a second partition extending from the top of said vessel downwardly to a second location which is lower than said first location and which is between the top and bottom of said vessel, said partitions being spaced from one another and extending across said vessel to divide the vessel into first and second separate upper regions which are separated by the first and second partitions above the first location and by the second partition between the first and second locations, said vessel being provided with an inlet opening in the top thereof between the partitions so that the space between the partitions serves as an inlet conduit to permit introduction of a feed mixture to be separated into said vessel in heat exchange relationship with fluids in the first and second upper regions above said first location, said vessel being provided with a product outlet below said second location and separate product outlets in each of said first and second upper regions; and
    fractionation trays positioned in said vessel in said first and second regions and between said product outlet and said second location.

2. The apparatus of claim 1, further comprising a cooling means positioned in the upper region of said vessel on the side of said second partition opposite said first partition.

* * * * *